June 25, 1935.   G. SPEEG   2,005,761
COMBINATION BACK UP AND TAIL LIGHT
Filed Nov. 20, 1933
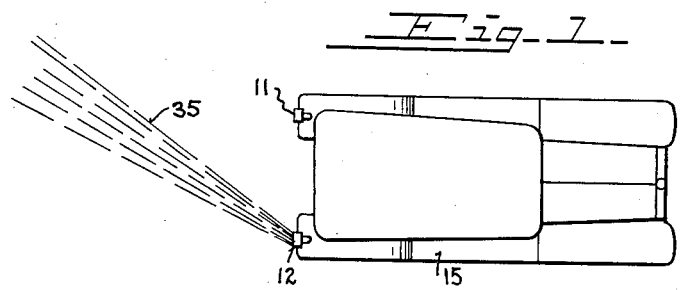
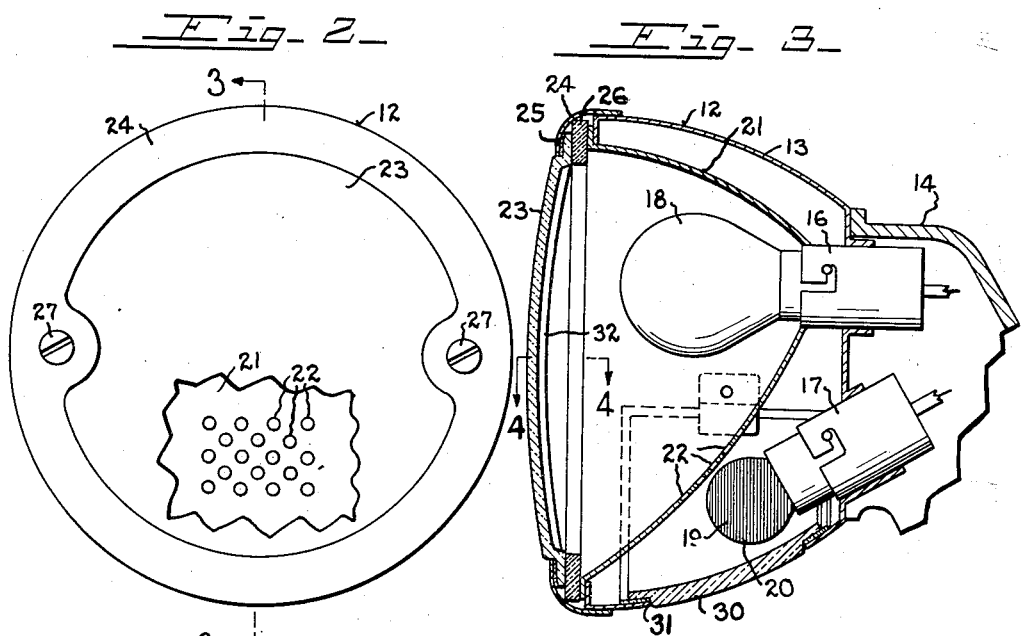
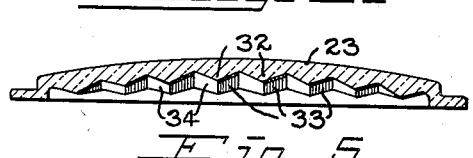
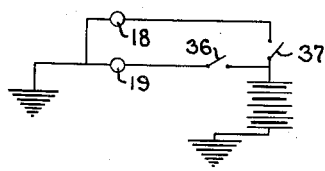
INVENTOR
GEORGE SPEEG.
BY
ATTORNEY Patented June 25, 1935

2,005,761

UNITED STATES PATENT OFFICE 2,005,761

COMBINATION BACK-UP AND TAIL LIGHT

George Speeg, Hartwell, Ohio

Application November 20, 1933, Serial No. 698,793

2 Claims. (Cl. 240—8.3)

My invention relates to a new and improved tail light for automobiles and more particularly to a combination light having the normal purpose of serving as a warning to approaching vehicles, and it is also provided with means for throwing a path of light across the rear of the car for illuminating the highway when it is desired to back-up the car.

Under present conditions a great number of vehicles are being equipped with dual tail lights, that is, one mounted on each of the rear fenders to create a balanced design to the vehicle and also to act as a warning to vehicles approaching from the rear as to the approximate width of the vehicle.

It is the object of my invention to provide one of the rear lights with means for throwing rays of light to the rear and across the path of the car. A further object is to provide means under normal operation of the car to create a signal or warning to approaching vehicles. A further object is to provide a lens for the lamp having vertical prisms on its inner face for reflecting the light in an angular relation from the lens. A further object is to coat one face of the prism with a pigment, preferably red, whereby viewing the lamp from the rear a red glow will be apparent. A further object is to provide a reflector for one of the lamps extending over the other lamp and provided with perforations adjacent the last named lamp.

My invention will be further readily understood from the following description and claims and from the drawing, in which latter:

Fig. 1 is a plan view of a vehicle with my improved lamp attached thereto.

Fig. 2 is a front view of the lamp with the lens partly broken away.

Fig. 3 is a vertical cross section of the lamp taken on the line 3—3 of Fig. 2.

Fig. 4 is a detail section of the lens taken in the plane of the line 4—4 of Fig. 3, and;

Fig. 5 is a wiring diagram of the electrical circuit.

Motor vehicles are usually provided with a tail light 11 mounted on the left rear fender for warning approaching vehicles and also to illuminate the usual license plate on the vehicle. My invention contemplates a second lamp mounted on the right rear fender and indicated generally at 12. This lamp comprises a housing 13 having a flat rear face suitably secured to a supporting bracket 14 which in turn is suitably bolted or riveted to the fender of the vehicle 15.
Within the housing 13 are a pair of lamp receiving sockets 16 and 17 suitably fixed thereto for the reception of light bulbs 18 and 19. The light bulb 19 is preferably coated with a red pigment 20. A reflector 21 is clamped to the housing and extends about the bulb 18 for reflecting the light from the bulb 18. This reflector is formed to extend over the bulb 19 and is provided with a plurality of perforations 22 to permit the light from the bulb 19 to shine therethrough. A lens 23 is provided for the lamp and is suitably clamped to the housing by means of a ring 24 with suitable gaskets 25 and 26 interposed between the lens and the ring and the lens and the housing. I prefer to have this lens formed of a yellow tinted glass. This ring may be suitably secured to the housing by means of threaded screws 27 received through the ring and threaded into the housing.

A lens 30 is received in an opening 31 in the lower portion of the lamp for permitting light rays from the bulb 19 to project downwardly to illuminate any desired information plate that may be mounted therebelow. The light bulb 19 is suitably wired to the usual tail light circuit and remains illuminated the entire time that the tail light circuit is closed. A separate switch is provided for the bulb 18 for illuminating the bulb, only when it is desired to reverse the car and to illuminate the highway to the rear and across the path of the car when it is desired to back-up the vehicle. The lens 23 is provided with a plurality of parallel vertical prisms 32 having one face thereof coated with a red pigment 33 whereby the rays of light from the bulb 19 under normal operation of the vehicle will create a red glow to the rear of the vehicle serving as a tail light and warning to vehicles approaching from the rear. The faces of these prisms are formed at approximately a 70 degree angle and with the face 34 of the prism a tinted yellow, the light rays from the bulb 18 contacting this angular face project the light to the rear and across the path of the vehicle as indicated at 35 in Fig. 1. The light rays contacting the red surface which may be coated with a film of silver or aluminum paint will reflect some of the light back against the reflector and intensify the rays through the face 34. The bulb 18 being of considerable candle power will project rays of light across the path of the vehicle and illuminate the roadway in aiding the driver of the vehicle in backing the vehicle after dark.

In the wiring diagram shown in Fig. 5 the normal tail light switch is indicated at 36 and a special switch for the light bulb 18 is indicated at 37.

It will be apparent from the foregoing description that I have devised a practical and improved lamp for the double purpose of acting as a tail light and also to provide strong light with the rays direct across the path of the vehicle for aiding in backing the vehicle after dark.

Having thus fully described my invention what I claim as new and desire to secure by Letters Patent, is:

1. A tail light comprising a housing, a pair of lamp receiving sockets in said housing, lamps in said sockets, a reflector for one of said lamps extending over the other lamp, perforations in said reflector adjacent to said last named lamp, said last named lamp coated with a red pigment and a lens secured to the face of said housing being provided with vertical prisms having one face thereof coated with a red pigment and the other face of said prisms projecting the rays of light in a horizontal angular direction.

2. A tail light comprising a housing, a pair of lamp receiving sockets in said housing, lamps in said sockets, a reflector for one of said lamps extending over the other lamp, perforations in said reflector adjacent to said last named lamp, and a lens secured to the face of said housing being provided with vertical prisms having one face of each prism coated with a red pigment and the other face of said prisms projecting the rays of light in a horizontal angular direction.

GEORGE SPEEG.